United States Patent [19]

Seely et al.

[11] Patent Number: 5,307,395

[45] Date of Patent: Apr. 26, 1994

[54] LOW-DAMAGE MULTILAYER MIRROR FOR THE SOFT X-RAY REGION

[75] Inventors: John F. Seely, Lorton; William R. Hunter, Springfield, both of Va.

[73] Assignee: The United States of America as represented by the Secretary of the Navy, Washington, D.C.

[21] Appl. No.: 953,697

[22] Filed: Sep. 30, 1992

[51] Int. Cl.$^5$ .............................................. G21K 1/06
[52] U.S. Cl. .................................... 378/84; 378/85; 378/145
[58] Field of Search ................ 378/84, 85, 34, 43, 378/145

[56] References Cited

U.S. PATENT DOCUMENTS

| | | | |
|---|---|---|---|
| 4,147,409 | 4/1979 | Apfel | 350/164 |
| 4,261,771 | 4/1987 | Dingle | 378/84 |
| 4,317,043 | 2/1982 | Rosenbluth et al. | 250/510 |
| 4,870,648 | 9/1989 | Ceglio et al. | 372/5 |
| 4,969,175 | 11/1990 | Nelson et al. | 378/84 |
| 5,022,064 | 6/1991 | Iketaki | 378/145 |
| 5,052,033 | 9/1991 | Ikeda et al. | 378/84 |

OTHER PUBLICATIONS

Keane et al., "Measurement of Multilayer Reflectivity & Stimulated Emission in the XUV Spectral Region", SPIE, vol. 563, Appl. of Thin-Film Multilayered Struct. to Figured X-Ray Optics (1985) pp. 253-257.
MacGowen et al., "Investigation of the Effect of Large X-ray Fluences on Multilayer Mirrors", the Lawrence Livermore National Laboratory pp. 1-25 w/figures.
Ceglio, Stearns et al., "Multipass Amplification of Soft X Rays in a Laser Cavity", Optics Letters, vol. 13, No. 2, Feb. 1988, pp. 108-110.
Ceglio, Gaines et al., "Time-Resolved Measurement of Double-Pass Amplification of Soft X Rays", Applied Optics, vol. 27, No. 24 Dec. 15, 1988, pp. 5022-5025.
Montcalm et al., "Multilayer Mirrors for XUV GE-Laser Wavelengths", Citation Unknown.
Eder et al., "Cavity Issues for Ni-Like Ta X-Ray Lasers", The Lawrence Livermore National Laboratory, pp. 1-7 SPIE 1991 International Symposium on Optical & Optoelectronic Applied Science & Engineering, vol. 1551, pp. 143 et seq (1991).
Apfel, "Electric Fields in Multilayers at Oblique Incidence", Applied Optics, vol. 15, No. 10, Oct. 1976, pp. 2339-2343.
Rosen et al., "Thermal Stability of Mo/Si Multilayers", SPIE, vol. 1547, Multilayer Optics for Advanced X-Ray Applications, 1991, pp. 212-220.
Boher et al., "Structural Characteristics and Performances of rf-Sputtered Mo/Si Multilayers for Soft X-ray Optics", SPIE, vol. 1547, Multilayer Optics for Advanced X-Ray Applications, 1991, pp. 21-38.
Stearns et al., "High-Performance Multilayer Mirrors for Soft X-Ray Projection Lithography", SPIE, vol. 1547, Multilayer Optics for Advanced X-Ray Applications, 1991, pp. 2-13.

Primary Examiner—David P. Porta
Attorney, Agent, or Firm—Thomas E. McDonnell; Daniel Kalish

[57] ABSTRACT

A mirror for reflecting radiation at a desired wavelength in the soft x-ray region, comprises a substrate and a coating on the substrate. The coating contains a first section and a second section. The first section comprises at least one layer made up of at least a spacer sublayer and a nodal sublayer. The optical thickness of each spacer sublayer is selected so that, upon application of the radiation of desired wavelength, the mirror generates a standing wave having a node in the middle of each nodal sublayer. The second section is disposed between the first section and the substrate, and comprises a plurality of optically absorptive layers.

32 Claims, 5 Drawing Sheets

LOW-DAMAGE MULTILAYER MIRROR FOR THE SOFT X-RAY REGION

BACKGROUND OF THE INVENTION

The present invention relates to high reflectance, narrow bandwidth, multilayer mirrors for reflecting radiation in the soft x-ray region, and more particularly, to mirrors for reflecting high intensity radiation.

As shown in FIG. 1, a typical mirror 15, designed to maximize reflectance and minimize bandwidth for the soft x-ray region, comprises alternating sublayers of greater optically absorptive material 20 and lesser optically absorptive material 30 on a substrate 40. Each bilayer pair 35 of such greater 20 and lesser 30 optically absorptive material typically has optical thickness of half of the desired wavelength. The multiple bilayers 35 thus provide an interference effect in order to provide high reflectance and a narrow bandwidth.

As shown in FIG. 2, mirror 15 generates a standing wave 60 in reflecting applied radiation 65 (FIG. 1) of the desired wavelength. The greater absorptive sublayers 20 typically contain the nodes 70 of that standing wave 60. As shown in FIG. 3, absorption is not symmetrical about the node 70 within the greater absorptive sublayers 20. Furthermore, the highest absorption in each greater absorptive sublayer 20 occurs at its boundaries, and the peak absorption among all the greater absorptive sublayers 20 occurs at the boundary between the topmost greater absorptive sublayer 20 and the ambient medium 80.

Such mirrors are susceptible to damage when the applied radiation 65 is of high intensity. The exact mechanism by which such high intensity radiation 65 causes damage is not known, but it is believed to involve strong electric fields, high absorption, or heating based on absorption. If the peak electric field squared or the peak absorption occurs at an interface of a greater absorptive sublayer 20 or near the ambient medium 80, any physical stress the peak electric field squared or the peak absorption causes, such as heat, is not readily dissipated and may damage the mirror 15.

Recent efforts to develop x-ray lasers have been hampered by such multilayer mirror damage. It would be highly desirable to provide double, triple or even multiple pass amplification in such lasers, but multilayers mirrors used in such experiments are usually destroyed even by a single exposure. The radiation intensity at the surface of such mirrors might be as high as $2-4*10^8$ Watts(W)/centimeter(cm)$^2$ which, for an exposure of $1*10^{-9}$ seconds(s), results in energy density of about 0.2-0.4 joules(J)/cm$^2$. High reflectance, narrow bandwidth, multilayer damage resistant mirrors would also be useful for reflecting high intensity radiation in other applications besides x-ray lasers, such as free electron lasers, x-ray projection lithography, imaging and holography of biological specimens, and material studies.

U.S. Pat. No. 4,147,409 to Joseph H. Apfel discloses a multilayer laser reflector with reduced electric field intensity. Such a design is intended for use in the visible and near infrared region and would not provide a workable damage resistant, high reflectance, narrow bandwidth mirror in the soft x-ray region.

SUMMARY OF THE INVENTION

It is an object of the present invention to provide a low damage, high reflectance, multilayer mirror with a relatively narrow bandwidth over the soft x-ray region.

Another object of the present invention is to provide a low damage, high reflectance, multilayer mirror with a relatively narrow bandwidth for reflecting high intensity radiation in the soft x-ray region.

A further object of the present invention is to provide a low damage, high reflectance, multilayer mirror with a relatively narrow bandwidth for reflecting high intensity radiation in the soft x-ray region, in which the optical thickness of the topmost one or more layers and sublayers are adjusted so as to enhance damage resistance without significantly reducing reflectance or significantly broadening the bandwidth.

These and other objects of the invention are achieved by a mirror for reflecting radiation at a desired wavelength in the soft x-ray region, the mirror comprising a substrate and a coating on the substrate. The coating contains a first section and a second section. The first section comprises at least one layer made up of at least a spacer sublayer and a nodal sublayer. The optical thickness of each spacer sublayer is selected so that, upon application of the radiation of desired wavelength, the mirror generates a standing wave having a node in the middle of each nodal sublayer. The second section is disposed between the first section and the substrate, and comprises a plurality of optically absorptive layers.

BRIEF DESCRIPTION OF THE DRAWINGS

These and other objects, features and advantages of the invention, as well as the invention itself, will become better understood by reference to the following detailed description when considered in connection with the accompanying drawings wherein like reference numerals designate identical or corresponding parts throughout the several views, and wherein.

DETAILED DESCRIPTION OF THE PREFERRED EMBODIMENT

Figure 4:
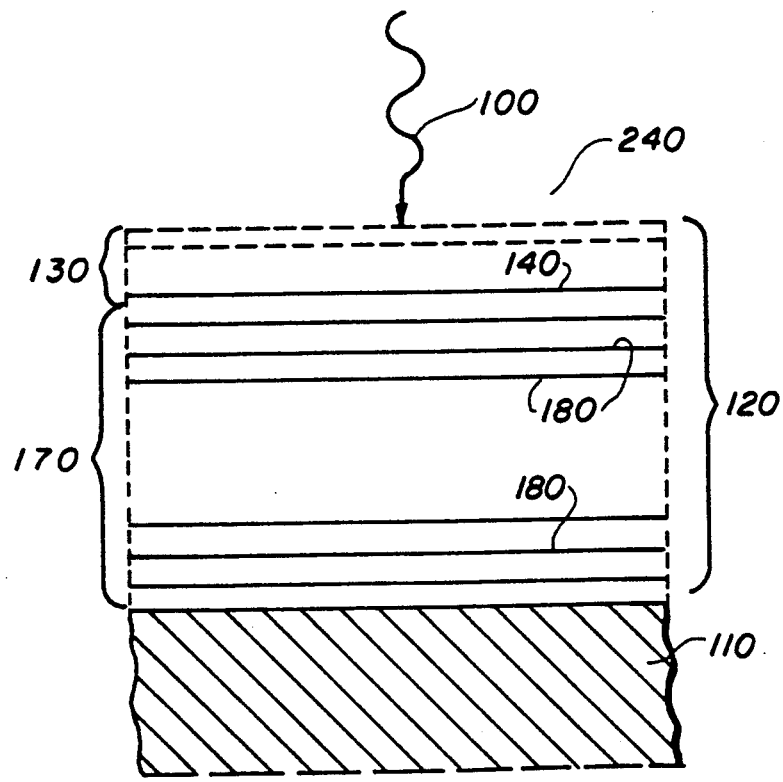
FIG. 4 is a sideview of a mirror according to the present invention.

Referring now to FIG. 4, FIG. 4 illustrates a mirror 90 according to the present invention for reflecting applied radiation 100 of a desired wavelength. The mirror 90 is comprised of a substrate 110 and a coating 120 on the substrate 110. The coating 120 comprises a first section 130.

The mirror 90 is designed for use with radiation 100 in the soft x-ray region. The wavelength of soft x-ray radiation is preferably between about 20 Å and about 300 Å, more preferably between about 20 Å and about 240 Å, and most preferably between about 23 Å and about 45 Å.

Figure 5:
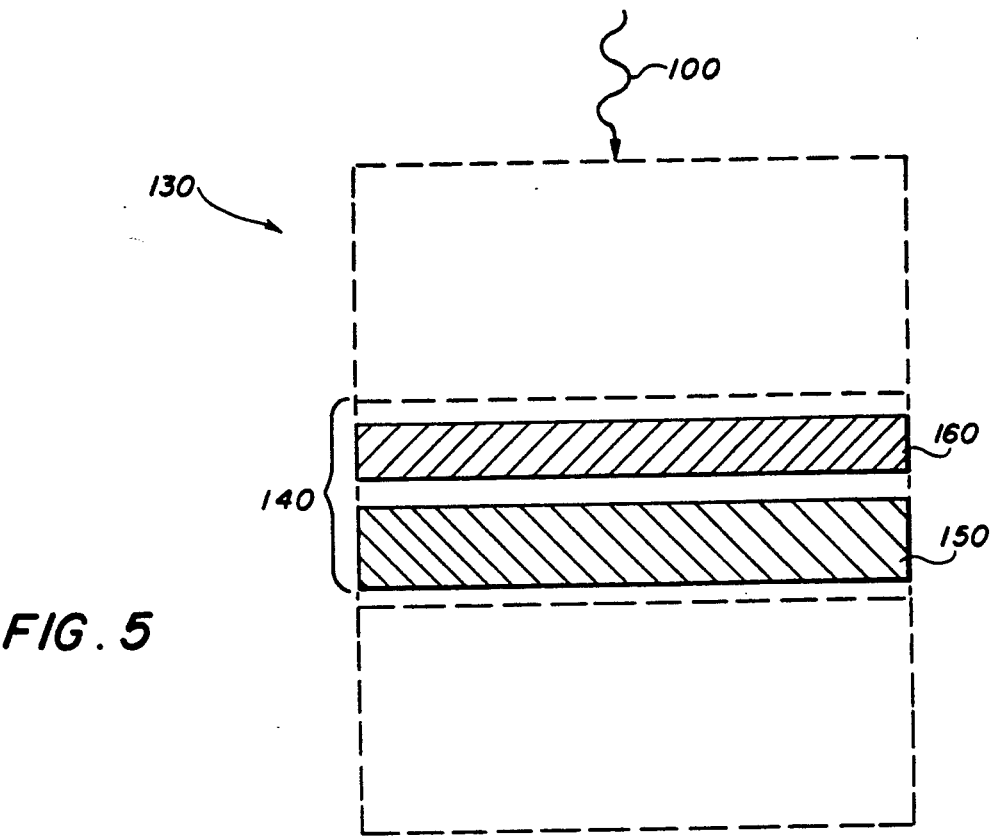
FIG. 5 is a sideview of the first section of the mirror of FIG. 4.
Figure 6:
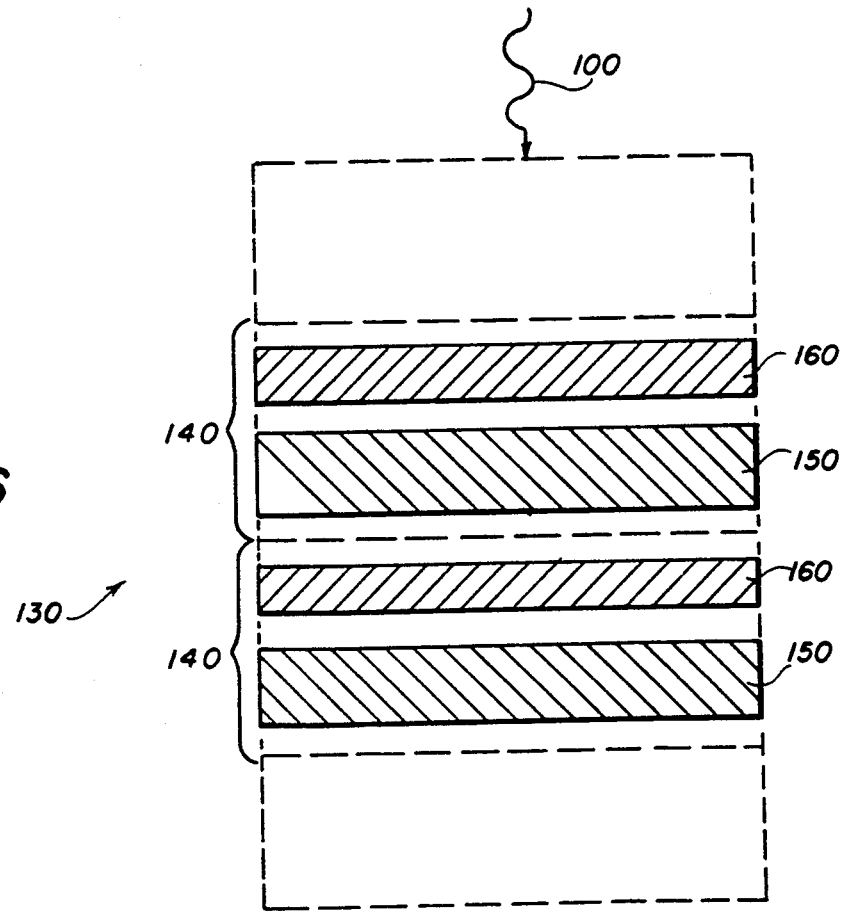
FIG. 6 is a sideview of an exemplary second section of the mirror of FIG. 4.

Referring now to FIG. 5, FIG. 5 shows the first section 130 of FIG. 4. The first section 130 has at least one layer 140, which includes at least a spacer sublayer 150 and a nodal sublayer 160. It is preferable that the spacer sublayer 150 of first section 130 be closer to substrate 110 (FIG. 4) than the nodal sublayer 160, but it is understood that the spacer and nodal sublayers 150 and 160 could be in any order or sequence. It is also preferable that if the first section 130 contained more than one layer 140, as shown in FIG. 6, then the spacer sublayers 150 and nodal sublayers 160 be in alternating sequence, although it is not absolutely required that they be in this or in any other order or sequence.

Figure 7:
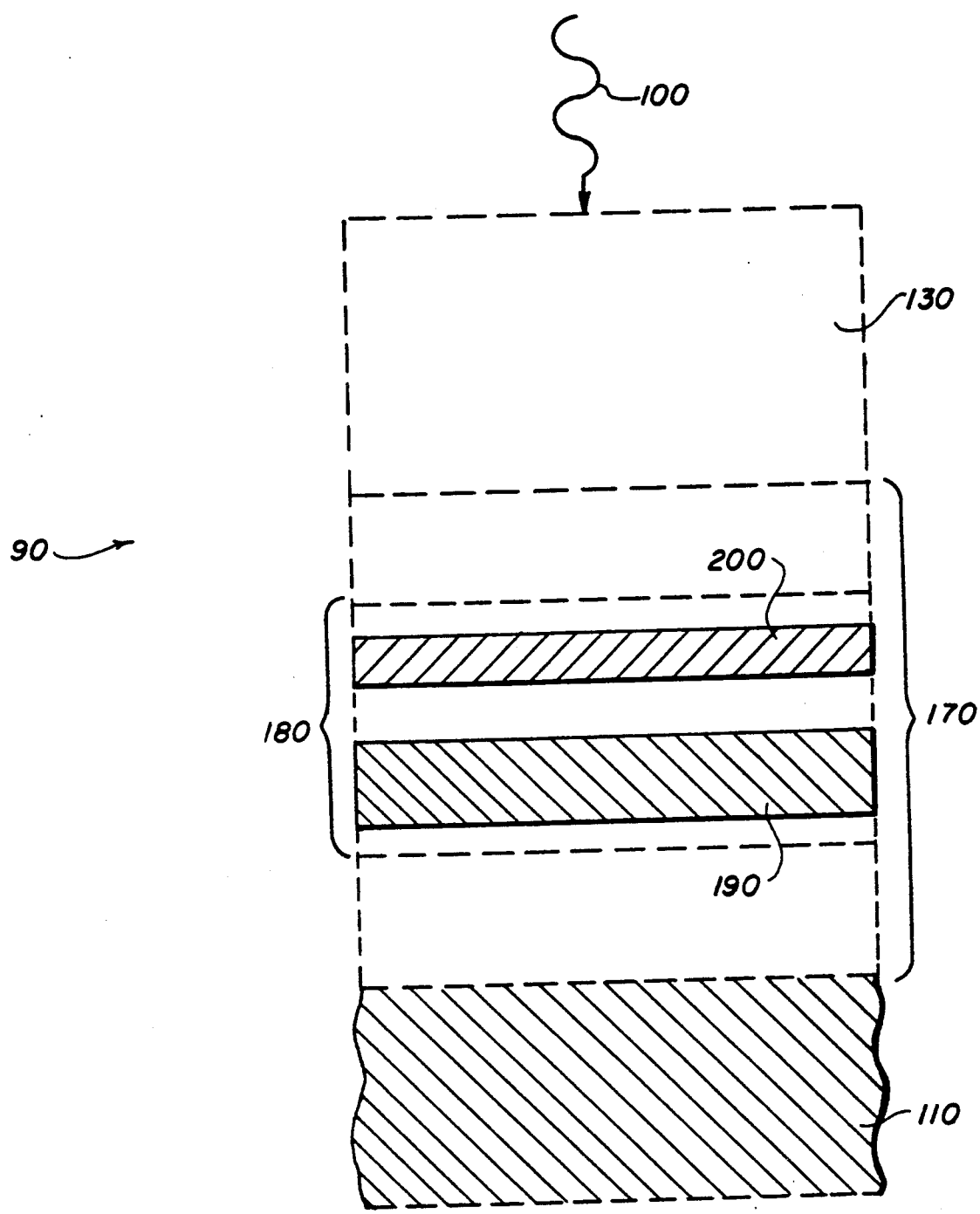
FIG. 7 is a sideview of an exemplary first section of the mirror of FIG. 4.

As shown in FIG. 4, the coating 120 also includes a second section 170 which has a plurality of optically absorptive layers 180. Referring now to FIG. 7, layer 180 is shown in more detail. Although not absolutely required for the practice of this invention, each layer 180 (FIG. 7), preferably comprises at least a spacer sublayer 190 and a nodal sublayer 200.

Although not absolutely required for the practice of this invention, the layer 180 of the second section 170 (FIGS. 4, 7) is preferably designed so that it, in combination with the substrate 110, is essentially a high reflectance, narrow bandwidth mirror at the desired wavelength in the soft x-ray region. As used herein, high reflectance means at least 5% reflectance at normal incidence. Narrow bandwidth means that the FWHM (full width at half-maximum) bandwidth is less than a calculated percentage of the center wavelength, which calculated percentage depends on the center wavelength. The center wavelength is the wavelength about which the bandwidth is determined. For a wavelength of about 44 Å, the calculated percentage is 2½, and for a wavelength of about 210 Å, the calculated percentage is 15%. For other wavelengths, the calculated percentage varies linearly with the center wavelength.

In order for mirror 90 (FIGS. 4, 7) to attain high reflectance and narrow bandwidth about a desired wavelength in the soft x-ray region, each layer 180 typically an has optical thickness of half the desired wavelength, and the sublayers 190 and 200 are typically arranged so that the spacer sublayers 190 and the nodal sublayers 200 are in alternating sequence, with a spacer sublayer 190 being closest to the substrate 110. The layers 180 thereby provide an interference effect, thus maximizing the reflectance and minimizing the bandwidth about the desired wavelength. Because each layers 180 typically absorbs radiation in the soft x-ray region, the number of layers 180 which would participate in reflection is limited. A multilayer second section 170 designed for use at the higher end of the soft x-ray region might have as few as 7 layers 180, and a multilayer second section 170 designed for use at the lower end of the soft x-ray region might have several hundred layers 180.

In the soft x-ray region, material which would be used in sublayers 150, 160 (FIGS. 5, 6), 190 and 200 and in layer 180 (FIG. 7) typically have optical properties defined by a complex index of refraction. Since the index of refraction enters into propagation expressions as an exponent, the real part of the complex index of refraction is indicative of the speed of propagation and the imaginary part, called the extinction coefficient, is a measure of absorption. The real part of the complex index of refraction is usually near unity over this wavelength range. The following TABLE lists the properties of relevant material at three critical wavelengths in the soft x-ray region:

TABLE

| Material | 44.83Å | 130Å | 234Å |
|---|---|---|---|
| Tungsten (W) | 0.9890 + i0.0129 | 0.938 + i0.043 | 0.816 + i0.143 |
| Carbon (C) | 0.9999 + i0.00017 | 0.971 + i0.00605 | 0.928 + i0.0386 |
| Gold (Ag) | 0.9919 + i0.00982 | 0.912 + i0.0463 | 0.878 + i0.192 |
| Aluminum (Al) | 0.9936 + i0.00308 | 1.001 + i0.0292 | 0.981 + i0.00522 |
| Molybdenum (Mo) | 0.9957 + i0.00593 | 0.929 + i0.0108 | 0.875 + i0.137 |
| Silicon (Si) | 0.9946 + i0.00300 | 1.001 + i0.00158 | 0.959 + i0.00610 |
| Boron Carbide (B$_4$C) | 0.9952 + i0.00259 | 0.966 + i0.00458 | 0.891 + i0.0263 |
| Silica (SiO$_2$) | 0.9940 + i0.00190 | 0.976 + i0.0116 | 0.925 + i0.0542 |
| Titania (TiO$_2$) | 0.9930 + i0.00116 | 0.946 + i0.0224 | 0.834 + i0.155 |

The effect of a complex index of refraction on optical properties is better understood by considering as an example two entries on the above TABLE. At 44.83 Å, carbon and tungsten have complex indices of refraction of 0.9999+i0.00017 and 0.9890+i0.0129, respectively. As discussed above, the read part of the complex index of refraction is indicative of the speed of propagation. The real parts of the indices of refraction for carbon and tungsten are 0.9999 and 0.9890, respectively. These values differ from unity by about 10 part in 100, and they differ from each other by about 1 part in 100. Carbon and tungsten do not have significantly different optical properties based on the real part of their complex indices of refraction. As to the imaginary part of the index of refraction, called the extinction coefficient, it is a measure of absorption. The extinction coefficients for carbon and tungsten are 0.00017 and 0.0129, respectively. The extinction coefficient for tungsten differs from zero by more than 1 part in 8, and it is more than 75 times the extinction coefficient for carbon. Tungsten absorbs radiation at 44.83 Å more than 75 times effectively as carbon, and so carbon and tungsten have significantly different optical properties based on their extinction coefficients.

The most preferred material for use as nodal/spacer layers 160 and 150 are tungsten/carbon, and molybdenum/silicon, the former being most preferred for use at the lower end of this region and the latter at the higher end. Boron carbide could also be used for spacer layers 150 at the lower end, and titanium carbide (TiC)/carbon could be used as nodal/spacer sublayers 160/150 at the lower end. Nickel carbide (NiC)/carbon, nickel carbide/boron carbide, molybdenum disilicide (MoSi$_2$)/silicon, tungsten carbide(WC)/carbon, and chromium carbide (CrC)/C could be used as nodal/spacer sublayers 160/150. In general, carbon, boron (B) and boron carbide are candidates for use as in the spacer sublayer 150 and cobalt (Co) can be used in the nodal sublayer 160.

Referring back to FIGS. 5 and 6, adjacent sublayers 150 and 160 in a multilayer mirror 90 (FIGS. 4, 7), which sublayers 150 and 160 have different optical properties, provide an interference effect which contributes to high reflectance and narrow bandwidth. Since optical characteristics in the soft x-ray region differ primarily in the extinction coefficient, materials for nodal and spacer sublayers 160 and 150 preferably have significantly differing extinction coefficients, with the nodal extinction coefficient being greater than the spacer extinction coefficient. As can be readily determined from the above TABLE, the extinction coefficient for nodal sublayer 160 is more than 5 times the value of the extinction coefficient for spacer sublayer 150 for the following combinations of nodal sublayer 160 and spacer sublayer 150: tungsten/carbon at 44.83 Å and 130 Å, and molybdenum/silicon at 130 Å and 234 Å. Specifically, the ratio of extinction coefficient for nodal sublayer 160 to extinction coefficient for spacer sublayer 150 was calculated above for tungsten/carbon at 44.83 as $0.0129 \div 0.00017 = 75.88$. Similarly, the ratio of extinction coefficients for nodal/spacer sublayers 160, 150 tungsten and carbon, respectively, at 130 Å is $0.043 \div 0.00605 = 7.11$, for molybdenum and silicon, respectively, at 130 Å is $0.0108 \div 0.00158 = 6.84$, and at 234 Å is $0.0137 \div 0.00610 = 22.46$. Such a ratio greater than 5 is considered significant and is preferable.

It is even more preferable if the ratio of extinction coefficient for nodal sublayer 160 to extinction coefficient for spacer sublayer 150 is greater than 20. As calculated above, nodal/spacer sublayers 160, 150 tungsten and carbon, respectively, have this property at 44.83 Å and molybdenum and silicon, respectively have this property at 234 Å.

The extinction coefficient of nodal sublayer 160 is preferably significant. As used herein, an extinction coefficient is considered significant if its product with the total number of layers 140 (FIGS. 4, 5, 6) and layers 180 (FIGS. 4, 7) is more than $\frac{1}{2}\pi \approx 0.16$. For example, tungsten could be considered for use in the nodal sublayer 160 in a mirror 90 designed for use at 44.83 Å if that mirror had 50 layers 140 and 180. Since the nodal extinction coefficient is 0.0129, the product of the nodal extinction coefficient with the number of layers is $0.0129 * 50 = 0.645$. Since this product is more than 0.16, therefore, the nodal extinction coefficient is significant. If the layers 180 have nodal sublayers 200, then a significant nodal extinction coefficient means that the layer 180 (FIGS. 4, 7) closest to the substrate 110 does not significantly contribute to reflection: most of the electric field would have been attenuated at positions farther from the substrate 110.

For similar reasons, the extinction coefficient of spacer sublayer 150 is preferably insignificant. A spacer extinction coefficient is considered insignificant if the product of it and the total number of layers 140 and layers 180 were less than $\frac{1}{2}\pi \approx 0.16$. For example, carbon could be considered for use in the spacer sublayer 150 in a mirror 90 designed for use at 44.83 Å if that mirror had 50 layers 140 and 180. Since the spacer extinction coefficient is 0.00017, the product of the spacer extinction coefficient with the number of layers is $0.00017 * 50 = 0.0085$. Since this product is less than 0.16, therefore, the spacer extinction coefficient is insignificant. Spacer sublayers 150 having insignificant extinction coefficients would not contribute to attenuation of the electric field in the coating 120 (FIG. 4).

As an alternative to the above formulation for extinction coefficients involving specific numeric criteria, material should be selected based on the spacer extinction coefficient and the nodal extinction coefficient having a value sufficiently greater than the spacer extinction coefficient so as to provide high reflectance and narrow bandwidth as defined above.

Figure 8:
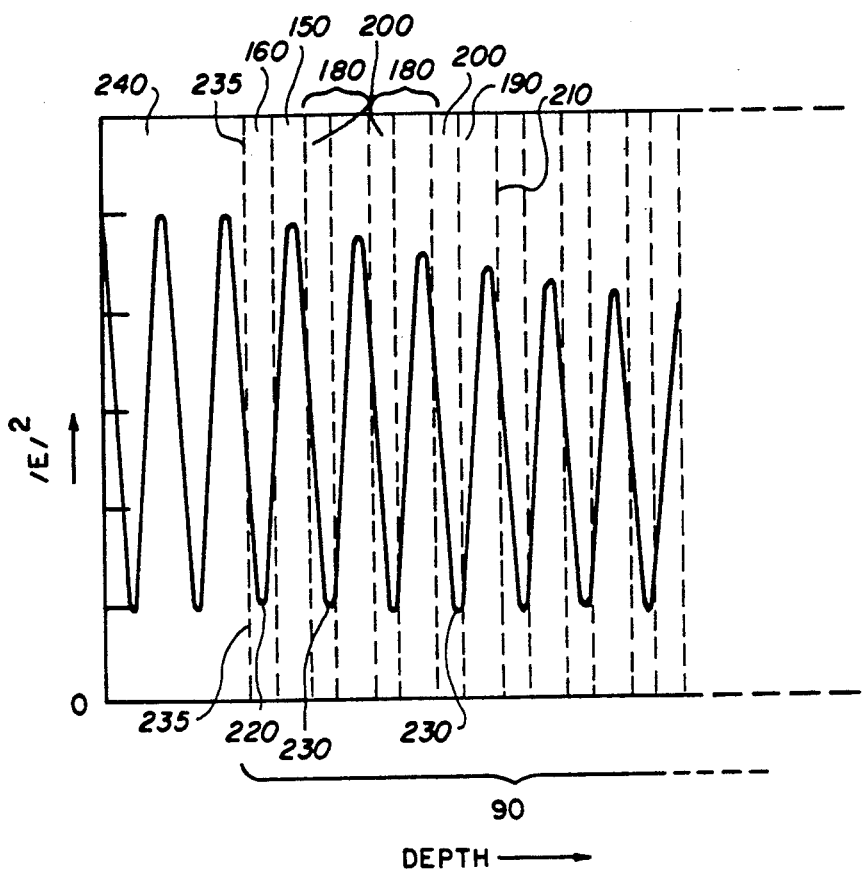
FIG. 8 is a graph of the electric field of a standing wave generated by the mirror of FIG. 4.

As shown in FIG. 8, the objective of this invention is to produce a standing wave 210 upon application of the incident radiation 100 (FIGS. 4, 5), in such a manner as to overcome the shortcomings of the prior art and increase the resistance of mirror 90 to damage from high intensity applied radiation 100. In order to accomplish this objective, each nodal sublayer 160 must contain a node 220 of the standing wave 210. Although not absolutely required for the practice of this invention, it is preferable that each layer 180 contain a nodal sublayer 200 which also contains a node 230.

Figure 9:
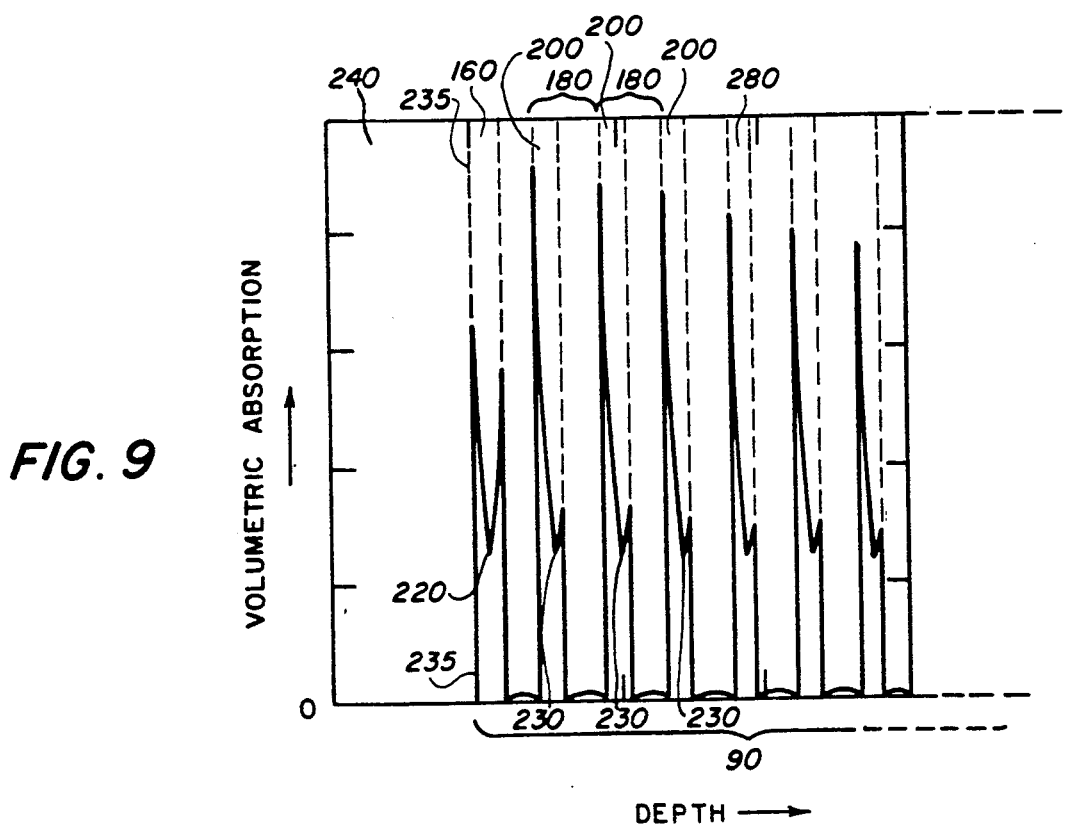
FIG. 9 is a graph of the absorption of radiation within the mirror of FIG. 4.
Figure 2:
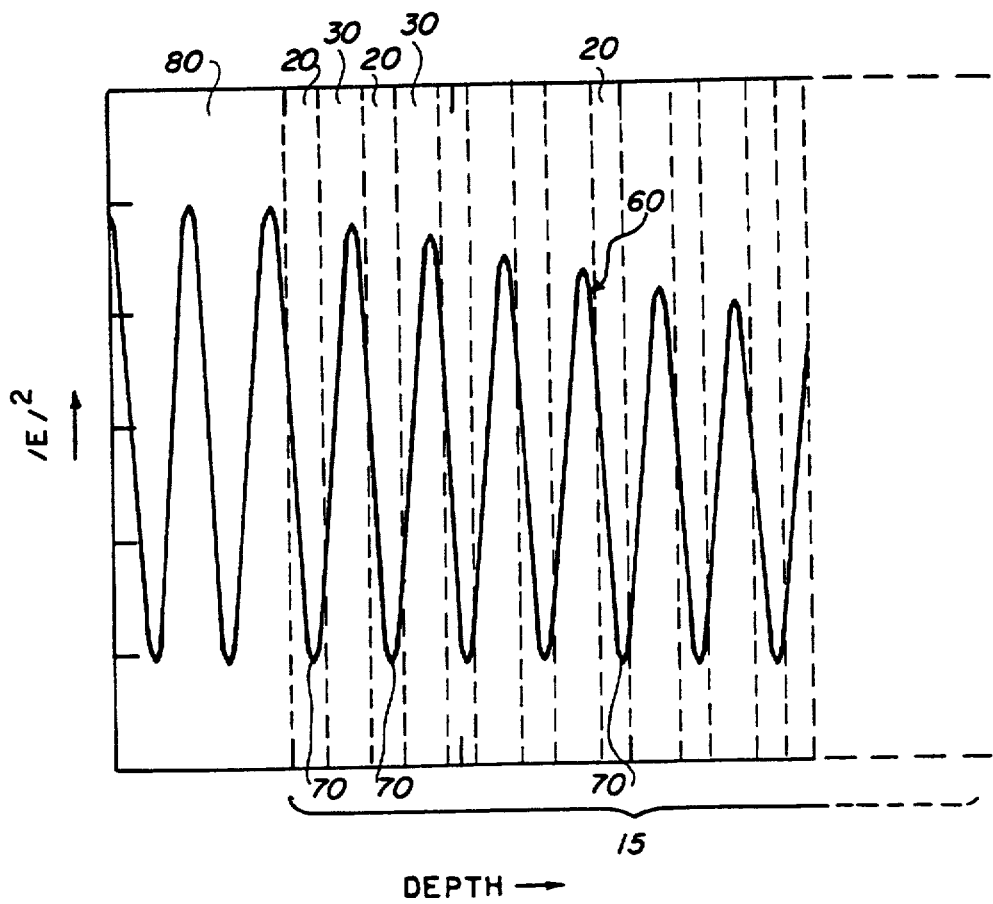
Figure 5:
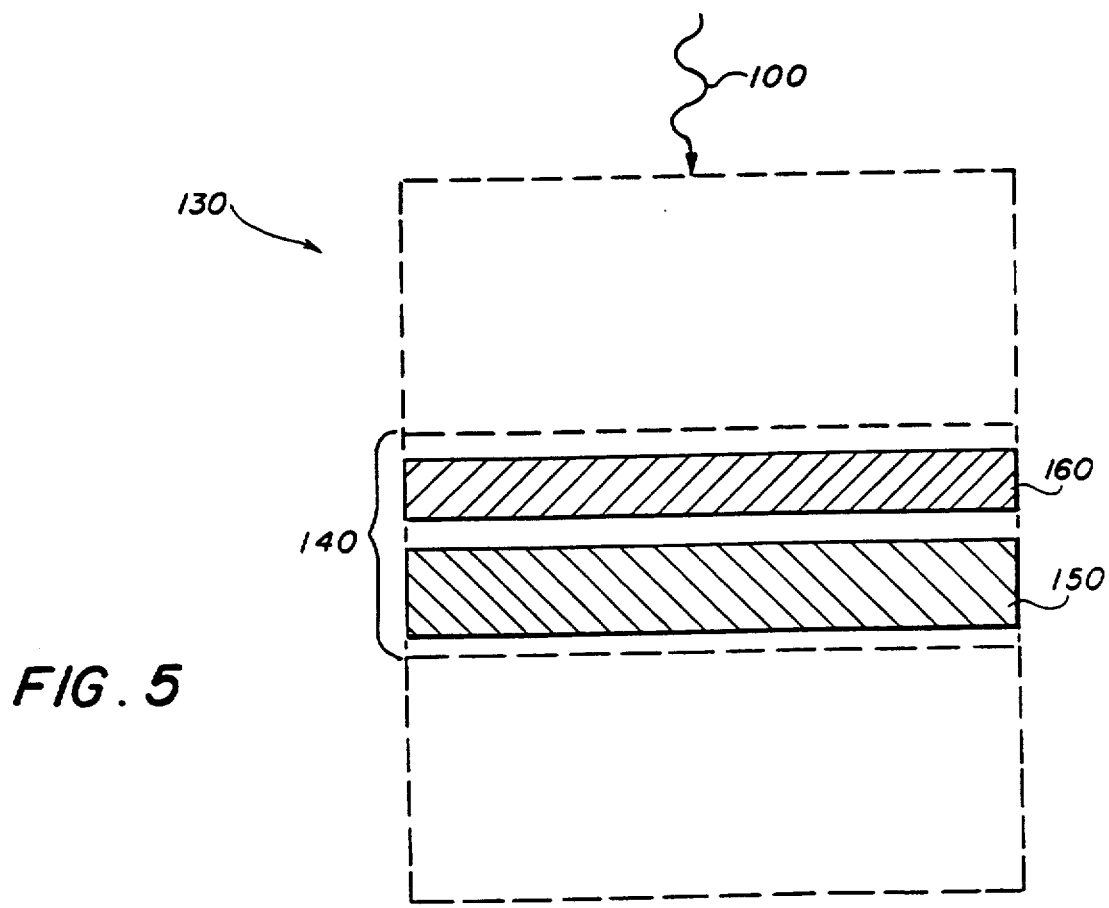
Figure 9:
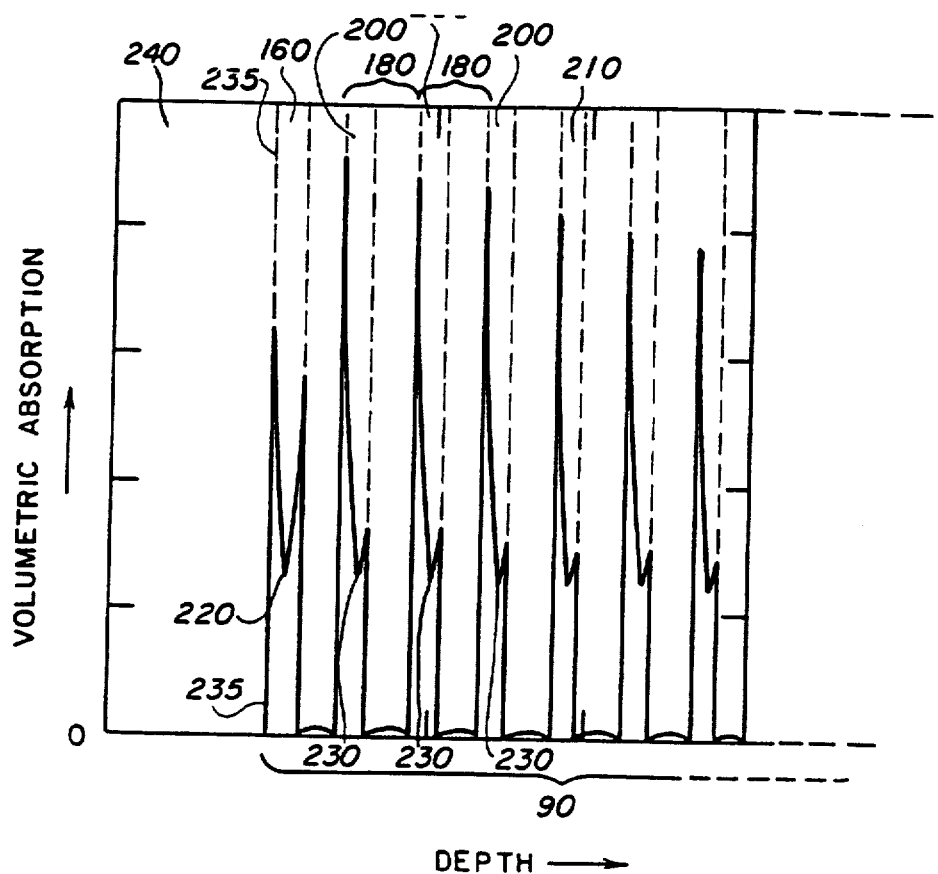

Referring now to FIG. 9, a manner of enhancing the resistance of mirror 90 to damage from high intensity radiation 100 involves a mirror 90 with at least two nodal sublayers 160 or a plurality of nodal sublayers 200. The topmost nodal sublayer 160, which is the nodal sublayer 160 farthest from the substrate 110 (FIG. 4), that is, closest to the surface (not shown) at which the applied radiation is first incident, should not have the peak absorption. In other words, if there is more than one nodal sublayer 160, then a nodal sublayer 160 other than the topmost nodal sublayer 160 would contain the peak absorption, and if there are no other nodal sublayers 160 besides the topmost nodal sublayer 160, but there are a plurality of nodal sublayers 200, then one of the nodal sublayers 200 would have the peak absorption. As a result of this condition, the peak absorption occurs away from the interface 235 of the coating 120 (FIG. 4) with the ambient medium 240 and any structural stress due to high intensity radiation 100 (FIGS. 4, 5, 7) is readily dissipated.

Referring back to FIG. 8, another manner of enhancing the resistance of mirror 90 to damage from high intensity radiation 100, involves the electric field squared. The nodal sublayers 160 and 200 have greater absorption than spacer sublayers 150 and 190, and the absorption within nodal sublayers 160 and 200 is proportional to the electric field squared. For the same reasons as discussed above regarding peak absorption, the resistance of mirror 90 to damage is enhanced by requiring that the topmost nodal sublayer 160 not have the maximum value of the electric field squared. In other words, the electric field squared within nodal sublayers 160 and 200 must reach a maximum within a nodal sublayer 160 or 200 different than the topmost nodal sublayer 160.

Still another manner, as shown in FIGS. 8 and 9, of enhancing the resistance of mirror 90 to damage from high intensity radiation 100, is that each nodal sublayer 160 contain a node 220 at or near its middle. This condition means that absorption is symmetrical about the middle of each nodal sublayer 160, and so absorption does not peak at the interface 235 between the coating 120 (FIG. 4) and the ambient medium 240. Any structural stress due to high intensity radiation 100 (FIGS. 4, 5, 7) is thus readily dissipated, thereby minimizing damage.

The above three conditions (regarding maximum absorption, maximum electric field squared, and the node 220 being in the middle of the nodal sublayer 160) are independently required and obtained by selecting the optical thickness of the spacer sublayer 150, the optical thickness of the nodal sublayer 160, the optical thickness of the layer 140, and the ratio of the nodal sublayer 160 optical thickness to the layer 140 optical thickness. The optical thickness of the spacer sublayer 150 and the nodal sublayer 160 have significant effects on these characteristics of the standing wave, and so it is preferable that the spacer sublayer 150 optical thickness or the nodal sublayer 160 optical thickness be selected so that one of the above three conditions is satisfied. It is more preferable that both the spacer sublayer 150 optical thickness and the nodal sublayer 160 optical thickness be selected to effect one of the above three conditions. It is most preferable that all four characteristics be selected to effect one of the above three conditions - the spacer sublayer 150 optical thickness, the nodal sublayer 160 optical thickness, the layer 140 optical thickness, and the ratio of the nodal sublayer 160 optical thickness to the layer 140 optical thickness. It is understood that adjusting the above optical characteristics to satisfy one of the three conditions (regarding maximum absorption, maximum electric field squared, and the node 220 being in the middle of the nodal sublayer 160) may result in lowering the reflectance or broadening the bandwidth. Nevertheless, the mirror 90 still has high reflectance and narrow bandwidth as defined herein.

EXAMPLES

Having described the invention in general, the following examples are given as particular embodiments thereof and to demonstrate the practice and advantages thereof. It is understood the examples are given by way of illustration and are not intended to limit the specification or the claims to follow in any manner.

EXAMPLE 1A

In this example, the desired wavelength is 44.83 Å.

The second section 170 includes 50 layers 180, each layer 180 including a spacer sublayer 190 of carbon and a nodal sublayer 200 of tungsten. The carbon and tungsten sublayers 190 and 200 are in alternating order, with the carbon spacer sublayer 190 closest to the substrate 110. The carbon spacer sublayer 190 thickness is 13.5 Å, the tungsten nodal sublayer 200 thickness is 9 Å, and the layer 180 thickness is 22.5 Å, resulting in a ratio of 0.40.

The first section 130 comprises a single layer 140, which includes a spacer sublayer 150 of carbon and a nodal sublayer 160 of tungsten. The carbon spacer sublayer 150 is closest to the second section 170. The carbon spacer sublayer 150 thickness is 11.5 Å, the tungsten nodal sublayer 160 thickness is 9 Å, the same as the thickness of the second section nodal sublayer 200. This alteration of the spacer sublayer thickness yields a layer 150 thickness of 20.5 Å and a ratio of 0.44.

The reflectance at normal incidence is 15%, and the FWHM bandwidth is about 2.25%. The electric field squared for this example is shown in FIG. 8, and the absorption is shown in FIG. 9. As seen in FIG. 9, the peak absorption occurs in a second section nodal sublayer 200, and does not occur in a first section nodal sublayer 160. Therefore, this example satisfies the first condition specified above. As seen in FIG. 8, the peak electric field squared among nodal sublayers 160 and 200 occurs in a second section nodal sublayer, and does not occur in a first section nodal sublayer 160. Therefore, this example satisfies the second condition specified above. As seen in both FIGS. 8 and 9, first section nodal sublayer 160 has a node in its middle. Therefore, this example satisfies the third condition specified above.

EXAMPLE 1B

In this example, the desired wavelength is 44.83 Å.

The second section 170 of this mirror 90 is the same as the second section 170 of example 1a.

The first section 130 is the same as the first section 130 except that an additional layer 140, which includes a spacer sublayer 150 of carbon and a nodal sublayer 160 of tungsten, is added, with the carbon spacer sublayer being closest to the layer 140 of Example 1a. The nodal sublayer 160 of this added layer is the topmost nodal sublayer 160 as discussed above. In this added layer, the carbon spacer sublayer 150 thickness is changed to 13 Å, and the tungsten nodal sublayer 160 thickness remains at 9 Å. This alteration of the thickness for the spacer sublayer 160 yields a layer 150 thickness of 22 Å and a ratio of 0.41.

For this example, the reflectance at normal incidence is 15%, and the FWHM bandwidth is about 2.25%. As with Example 1a, this example satisfies all three conditions, except that the maximum electric field squared and the maximum absorption occur in a first section nodal sublayer 160, and do not occur the topmost nodal sublayer 160.

EXAMPLE 2A

In this example, the desired wavelength is 130 Å.

The second section 170 includes 20 layers 180, each layer 180 including a spacer sublayer 190 of silicon and a nodal sublayer 200 of molybdenum. The silicon and molybdenum sublayers 190 and 200 are in alternating order, with the silicon spacer sublayer 190 closest to the substrate 110. The silicon spacer sublayer 190 thickness is 33.5 Å, the molybdenum nodal sublayer 200 thickness is 33.5 Å, and the layer 180 thickness is 67 Å, resulting in a ratio of 0.5.

The first section 130 comprises a single layer 140, which includes a spacer sublayer 150 of silicon and a nodal sublayer 160 of molybdenum. The silicon spacer sublayer 150 is closest to the second section 170. The silicon spacer sublayer 150 thickness is 25 Å, and the molybdenum nodal sublayer 160 thickness is 25 Å. This alteration of the spacer and nodal sublayer thicknesses yields a layer 150 thickness of 50 Å and a ratio of 0.50.

For this example, the reflectance at normal incidence is 67%. As with example 1a, the peak absorption occurs in a second section nodal sublayer 200, and does not occur in a first section nodal sublayer 160. Therefore, this example satisfies the first condition specified above. Furthermore, as with example 1a, the peak electric field squared among nodal sublayers 160 and 200 occurs in a second section nodal sublayer, and does not occur in a first section nodal sublayer 160. Therefore, this example satisfies the second condition specified above. Lastly, as with example 1a, first section nodal sublayer 160 has a node in its middle. Therefore, this example satisfies the third condition specified above.

EXAMPLE 2B

In this example, the desired wavelength is 130 Å.

The second section 170 includes 20 layers 180, each layer 180 including a spacer sublayer 190 of silicon and a nodal sublayer 200 of molybdenum. The silicon and molybdenum sublayers 190 and 200 are in alternating order, with the silicon spacer sublayer 190 closest to the substrate 110. In addition, layer 180 includes two diffusion sublayers of molybdenum silicide ($MoSi_2$), a first diffusion sublayer between the nodal and spacer sublayers 200 and 190, and a second diffusion sublayer closer to substrate 110 than the spacer sublayer 190. The silicon spacer sublayer 190 thickness is 23 Å, the molybdenum nodal sublayer 200 thickness is 20 Å, the thickness of the first diffusion sublayer is 16 Å, and the thickness of the second diffusion sublayer is 8 Å. The layer 180 thickness is 67 Å, resulting in a ratio of 0.30.

The first section 130 comprises a single layer 140, which includes a spacer sublayer 150 of silicon and a nodal sublayer 160 of molybdenum. The silicon spacer sublayer 150 is closest to the second section 170. In addition, layer 140 includes two diffusion sublayers of molybdenum silicide ($MoSi_2$), a first diffusion sublayer between the nodal and spacer sublayers 160 and 150, and a second diffusion sublayer closer to the second section 170 than the spacer sublayer 150. The silicon spacer sublayer 150 thickness is 10 Å, the molybdenum nodal sublayer 160 thickness is 20 Å, the thickness of the first diffusion sublayer is 16 Å, and the thickness of the second diffusion sublayer is 8 Å. This alteration of the spacer thickness yields a layer 150 thickness of 54 Å and a ratio of 0.37.

As with examples 1a and 2a, this example satisfies the first, second and third conditions specified above.

EXAMPLE 3

In this example, the desired wavelength is 234 Å.

The second section 170 includes 10 layers 180, each layer 180 including a spacer sublayer 190 of silicon and a nodal sublayer 200 of molybdenum. The silicon and molybdenum sublayers 190 and 200 are in alternating order, with the silicon spacer sublayer 190 closest to the substrate 110. The silicon spacer sublayer 190 thickness is 90 Å, the molybdenum nodal sublayer 200 thickness is 35 Å, and the layer 180 thickness is 125 Å, resulting in a ratio of 0.28.

The first section 130 comprises a single layer 140, which includes a spacer sublayer 150 of silicon and a nodal sublayer 160 of molybdenum. The silicon spacer sublayer 150 is closest to the second section 170. The silicon spacer sublayer 150 thickness is 70 Å, and the molybdenum nodal sublayer 160 thickness is 50 Å. This alteration of the spacer and nodal sublayer thicknesses yields a layer 150 thickness of 120 Å and a ratio of 0.42.

For this example, the reflectance at normal incidence is 36%. As with examples 1a, 2a, and 2b, this example satisfies the first, second and third conditions specified above.

The concepts presented here are quite general and apply, for example, for rough or diffuse interfaces, for multiple-order reflectance, for oblique incidence, and for any soft x-ray wavelength region.

It is understood that many other changes and additional modifications of the invention are possible in view of the teachings herein without departing from the scope of the invention as defined in the appended claims.

What is claimed is:

1. A mirror for reflecting radiation at a desired wavelength in the soft x-ray region, the mirror comprising a substrate and a coating on the substrate, said coating comprising:
   (a) a first section comprising at least one layer, said layer comprising at least a spacer sublayer and a nodal sublayer, the optical thickness of each nodal sublayer being selected so that upon application of the radiation of desired wavelength, the mirror generates a standing wave having a node in the middle of each nodal sublayer; and
   (b) a second section disposed between said substrate and said first section, said second section comprising a plurality of optically absorptive layers.

2. A mirror for reflecting radiation at a desired wavelength in the soft x-ray region, the mirror comprising a substrate and a coating on the substrate, said coating comprising:
   (a) a first section comprising at least one layer, said layer comprising at least a spacer sublayer and a nodal sublayer, the optical thickness of each spacer sublayer being selected so that upon application of the radiation of desired wavelength, the mirror generates a standing wave having a node in the middle of each nodal sublayer; and
   (b) a second section disposed between said substrate and said first section, said second section comprising a plurality of optically absorptive layers.

3. The mirror according to claim 2 wherein the optical thickness of each spacer sublayer and the optical thickness of each nodal sublayer are selected so that said standing wave has a node in the middle of each nodal sublayer.

4. The mirror according to claim 3 wherein for each layer, the optical thickness of said spacer sublayer, the optical thickness of said nodal sublayer, the optical thickness of said layer, and the ratio of sand nodal sublayer optical thickness to said layer optical thickness are selected so that said standing wave has a node in the middle of each nodal sublayer.

5. The mirror according to claim 3 wherein each nodal/spacer sublayer pair is selected from the pair group consisting of titanium carbide/carbon, nickel carbide/carbon, nickel carbide/boron carbide, molybdenum disilicide/silicon, tungsten carbide/carbon, and chromium carbide/carbon.

6. The mirror according to claim 3 wherein each spacer sublayer is characterized by a spacer extinction coefficient and each nodal sublayer is characterized by a nodal extinction coefficient of at least 0.16 divided by the total number of said first section layers and second section layers, said nodal extinction coefficient further being at least 5 times the value of said spacer extinction coefficient.

7. The mirror according to claim 3 wherein each nodal/spacer sublayer pair is selected from the pair group consisting of tungsten/carbon and molybdenum/silicon.

8. The mirror according to claim 3 wherein each second section layer comprises at least a nodal sublayer, and each nodal sublayer contains a node of said standing wave.

9. The mirror according to claim 3 wherein said first section further comprises a first diffusion sublayer disposed between said nodal sublayer and said spacer sublayer.

10. The mirror according to claim 9 further including a second diffusion sublayer disposed between said first and second sections.

11. The mirror according to claim 9 further including a second diffusion sublayer disposed on a surface of said first section away from said second section.

12. The mirror according to claim 3 wherein said first section further comprises a plurality of said layers, and said nodal sublayers and spacer sublayers are arranged in an alternating sequence.

13. The mirror according to claim 3 wherein a spacer sublayer in said first section is adjacent to said second section.

14. The mirror according to claim 3 wherein the spacer sublayer is selected from the group consisting of carbon, boron, and boron carbide.

15. The mirror according to claim 3 wherein the nodal sublayer is cobalt.

16. A mirror for reflecting radiation at a desired wavelength in the soft x-ray region, the mirror comprising a substrate and a coating on the substrate, said coating comprising:
(a) a first section comprising at least one layer, said layer comprising at least a spacer sublayer and a nodal sublayer, the optical thickness of each spacer sublayer and of each nodal sublayer being selected so that upon application of the radiation of desired wavelength, the mirror generates a standing wave having an ode in the middle of each nodal sublayer, wherein each spacer sublayer is characterized by a spacer extinction coefficient and each nodal sublayer is characterized by a nodal extinction coefficient sufficiently greater than said spacer extinction coefficient so that upon application of the radiation of desired wavelength, the mirror has a reflectance of at least 5% and a Full Width at Half-Maximum bandwidth of less than a calculated percentage of the desired wavelength, wherein said calculated percentage is linearly dependent on the desired wavelength, so that said calculated percentage is $2\frac{1}{2}\%$ for a desired wavelength of 44 Å and 15% for a desired wavelength of 210 Å; and
(b) a second section disposed between said substrate and said first section, said second section comprising a plurality of optically absorptive layers.

17. A mirror for reflecting radiation at a desired wavelength in the soft x-ray region, the mirror comprising a substrate and a coating on the substrate, said coating comprising:
(a) a first section comprising a layer, said layer comprising at least a spacer sublayer and a nodal sublayer; and
(b) a second section disposed between said substrate and said first section, said second section comprising a plurality of optically absorptive layers, each layer comprising at least a nodal sublayer; wherein the optical thickness of said first section nodal sublayer is selected so that upon application of the radiation of desired wavelength, the mirror generates a standing wave having a node in said first section nodal sublayer and in each second section nodal sublayer, and so that the electric field squared of said standing wave within the second section nodal sublayers attains a maximum value greater than the electric field squared of said standing wave at all positions within said first section nodal sublayer.

18. A mirror for reflecting radiation at a desired wavelength in the soft x-ray region, the mirror comprising a substrate and a coating on the substrate, said coating comprising:
(a) a first section comprising a layer, said layer comprising at least a spacer sublayer and a nodal sublayer; and
(b) a second section disposed between said substrate and said first section, said second section comprising a plurality of optically absorptive layers, each layer comprising at least a nodal sublayer;
wherein the optical thickness of said first section spacer sublayer is selected so that upon application of the radiation of desired wavelength, the mirror generates a standing wave having a node in said first section nodal sublayer and in each second section nodal sublayer, and so that the electric field squared of said standing wave within the second section nodal sublayers attains a maximum value greater than the electric field squared is of said standing wave at all positions within said first section nodal sublayer.

19. The mirror according to claim 18 wherein the optical thickness of said first section spacer sublayer and the optical thickness of said first section nodal sublayer are selected so that said standing wave has a node in said first section nodal sublayer and in each second section nodal sublayer, and so that the electric field squared of said standing wave within the second section nodal sublayers attains a maximum value greater than the electric field squared of said standing wave at all positions within said first section nodal sublayer.

20. The mirror according to claim 19 wherein the optical thickness of said first section spacer sublayer, the optical thickness of said first section nodal sublayer, the optical thickness of said first section layer, and the ratio of said first section nodal sublayer optical thickness to said first section layer optical thickness are selected so that the electric field squared of said standing wave within the second section nodal sublayers attains a maximum value greater than the electric field squared of said standing wave at all positions within said first section nodal sublayer.

21. A mirror for reflecting radiation at a desired wavelength in the soft x-ray region, the mirror comprising a substrate and a coating on the substrate, said coating comprising:
(a) a first section comprising a top subsection and a bottom subsection, each subsection containing at least one layer comprising at least a spacer sublayer and a nodal sublayer, said top subsection further comprising a topmost nodal sublayer, said topmost nodal sublayer being farther from said substrate than all other nodal sublayers, the optical thickness of each nodal sublayer being selected so that upon application of the radiation of desired wavelength, the mirror generates a standing wave having anode in each nodal sublayer, and so that the absorption of radiation within the nodal sublayers of said bottom subsection attains a maximum value greater than the absorption of radiation at all positions within said topmost nodal sublayer; and
(b) a second section disposed between said substrate and said first section, said second section comprising a plurality of optically absorptive layers.

22. A mirror for reflecting radiation at a desired wavelength in the soft x-ray region, the mirror comprising a substrate and a coating on the substrate, said coating comprising:
(a) a first section comprising a top subsection and a bottom subsection, each subsection containing at least one layer comprising at least a spacer sublayer and a nodal sublayer, said top subsection further comprising a topmost nodal sublayer, said topmost nodal sublayer being farther from said substrate than all other nodal sublayers, the optical thickness of each spacer sublayer being selected so that upon application of the radiation of desired wavelength, the mirror generates a standing wave having a node in each nodal sublayer, and so that the absorption of radiation within the nodal sublayers of said bottom subsection attains a maximum value greater than the absorption of radiation at all positions within said topmost nodal sublayer; and
(b) a second section disposed between said substrate and said first section, said second section comprising a plurality of optically absorptive layers.

23. The mirror according to claim 22 wherein the optical thickness of each sublayer and the optical thickness of each nodal sublayer are selected so that the absorption of radiation within the nodal sublayers of said bottom subsection attains a maximum value greater than absorption of radiation at all positions within said topmost nodal sublayer.

24. The mirror according to claim 23 wherein for each first section layer, the optical thickness of said spacer sublayer, the optical thickness of said nodal sublayer, the optical thickness of said layer, and the ratio of said nodal sublayer optical thickness to said layer optical thickness are selected so that the absorption of radiation within the nodal sublayers of said bottom subsection attains a maximum value greater than the absorption of radiation at all positions within said topmost nodal sublayer.

25. A mirror for reflecting radiation at a desired wavelength in the soft x-ray region, the mirror comprising a substrate and a coating on the substrate, said coating comprising:
(a) a first section comprising a layer, said layer comprising at least a spacer sublayer and a nodal sublayer; and
(b) a second section disposed between said substrate and said first section, said second section comprising a plurality of optically absorptive layers, each layer comprising at least a nodal sublayer;
wherein the optical thickness of said first section nodal sublayer is selected so that upon application of the radiation of desired wavelength, the mirror generates a standing wave having a node in said first section nodal sublayer and in each second section nodal sublayer and so that the absorption of radiation within said second section nodal sublayers attains a maximum value greater than the absorption of radiation at all positions within said first section nodal sublayer.

26. A mirror for reflecting radiation at a desired wavelength in the soft x-ray region, the mirror comprising a substrate and a coating on the substrate, said coating comprising:
(a) a first section comprising a layer, said layer comprising at least a spacer sublayer and a nodal sublayer; and
(b) a second section disposed between said substrate and said first section, said second section comprising a plurality of optically absorptive layers, each layer comprising at least a nodal sublayer;
wherein the optical thickness of said first section spacer sublayer is selected so that upon application of the radiation of desired wavelength, the mirror generates a standing wave having a node in said first section nodal sublayer and in each second section nodal sublayer and so that the absorption of radiation within the second section nodal sublayers attains a maximum value greater than the absorption of radiation at all positions within the first section nodal sublayer.

27. The mirror according to claim 26 wherein the optical thickness of said first section spacer sublayer and the optical thickness of said first section nodal sublayer are selected so that said standing wave has a node in said first section nodal sublayer and in each second section nodal sublayer, and so that the absorption of radiation within the second section nodal sublayers attains a maximum value greater than the absorption of radiation at all positions within said first section nodal sublayer.

28. The mirror according to claim 27 wherein the optical thickness of said first section spacer sublayer, the optical thickness of said first section nodal sublayer, the optical thickness of said first section layer, and the ratio of said first section nodal sublayer optical thickness to said first section layer optical thickness are selected so that the absorption of radiation within the second section nodal sublayers attains a maximum value greater than the absorption of radiation at all positions within said first section nodal sublayer.

29. A mirror for reflecting radiation at a desired wavelength in the soft x-ray region, the mirror comprising a substrate and a coating on the substrate, said coating comprising:
(a) a first section comprising a top subsection and a bottom subsection, each subsection containing at least one layer comprising at least a spacer sublayer and a nodal sublayer, said top subsection further comprising a topmost nodal sublayer, said topmost nodal sublayer being farther from said substrate than all other nodal sublayers, the optical thickness of each spacer sublayer being selected so that upon application of the radiation of desired wavelength, the mirror generates a standing wave having a node in each nodal sublayer, and so that the electric field squared of said standing wave within the nodal sublayers of said bottom subsection attains a maximum value greater than the electric field squared of said standing wave at all positions within said topmost nodal sublayer; and
(b) a second section disposed between said substrate and said first section, said second section comprising a plurality of optically absorptive layers.

30. The mirror according to claim 29 wherein the optical thickness of each spacer sublayer and the optical thickness of each nodal sublayer are selected so that the electric field squared of said standing wave within the nodal sublayers of said bottom subsection attains a maximum value greater than the electric field squared of said standing wave at all positions within said topmost nodal sublayer.

31. The mirror according to claim 30 wherein for each layer, the optical thickness of said spacer sublayer, the optical thickness of said nodal sublayer, the optical thickness of said layer, and the ratio of said nodal sublayer optical thickness to said layer optical thickness are selected so that the electric field squared of said standing wave within the nodal sublayers of said bottom subsection attains a maximum value greater than the electric field squared of said standing wave at all positions within said topmost nodal sublayer.

32. A mirror for reflecting radiation at a desired wavelength in the soft x-ray region, the mirror comprising a substrate and a coating on the substrate, said coating comprising:

(a) a first section comprising a top subsection and a bottom subsection, each subsection containing at least one layer comprising at least a spacer sublayer and a nodal sublayer, said top subsection further comprising a topmost nodal sublayer, said topmost nodal sublayer being farther from said substrate than all other nodal sublayers, the optical thickness of each nodal sublayer being selected so that upon application of the radiation of desired wavelength, the mirror generates a standing wave having a node in each nodal sublayer, and so that the electric field squared of said standing wave within the nodal sublayers of said bottom subsection attains a maximum value greater than the electric field squared of said standing wave at all positions within said topmost nodal sublayer; and (b) a second section disposed between said substrate and said first section, said second section comprising a plurality of optically absorptive layers.

* * * * *

UNITED STATES PATENT AND TRADEMARK OFFICE
CERTIFICATE OF CORRECTION

PATENT NO. : 5,307,395

DATED : April 26, 1994

INVENTOR(S) : John F. Seely and William Hunter

Figure 1:
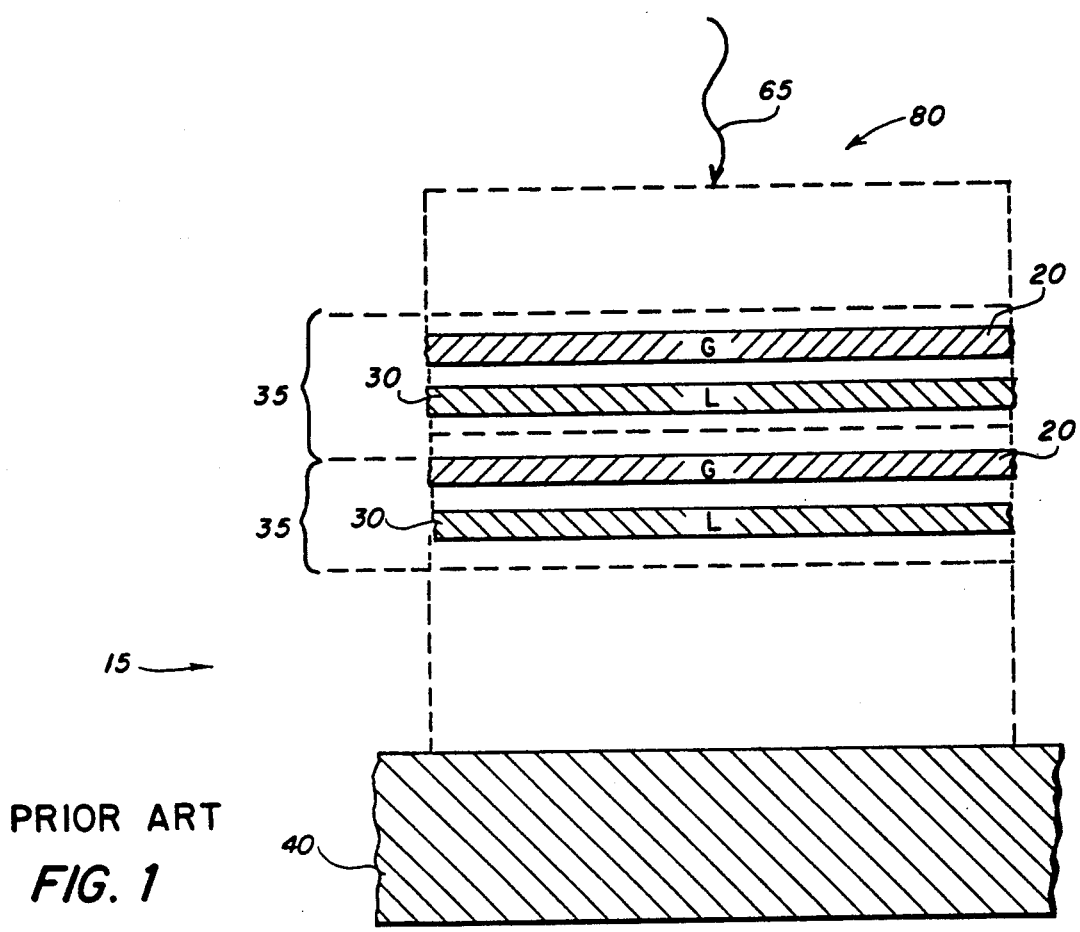
FIG. 1 is a sideview of a multilayer, high reflectance, narrow bandwidth soft x-ray mirror according to prior art.
Figure 2:
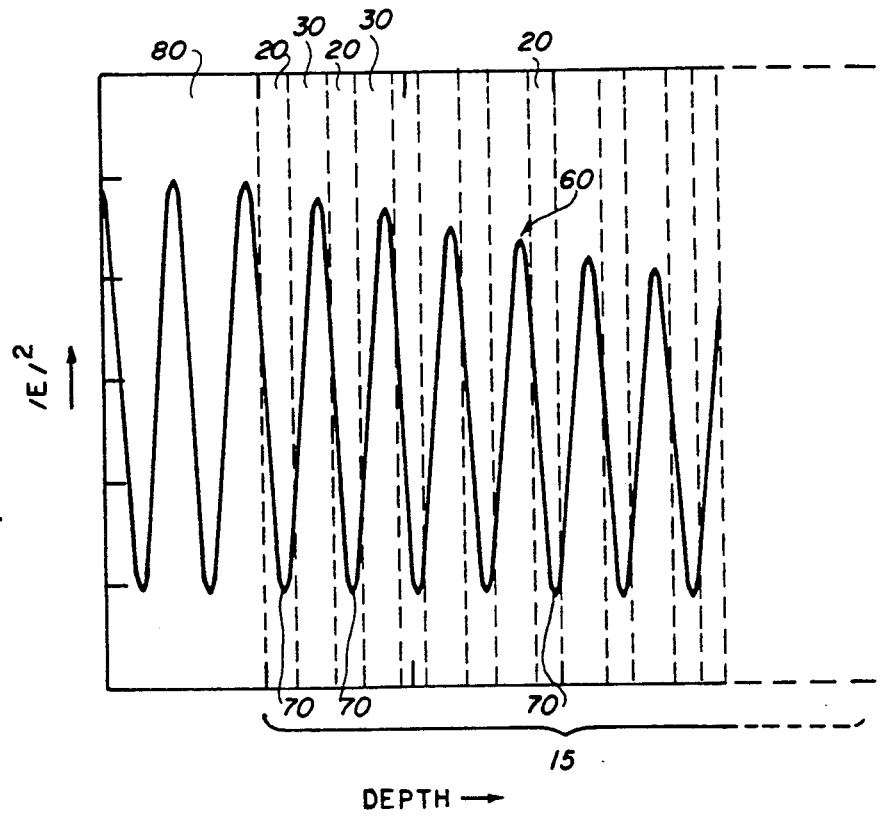
FIG. 2 is a graph of the electric field of a standing wave generated by the mirror of FIG. 1.
Figure 3:
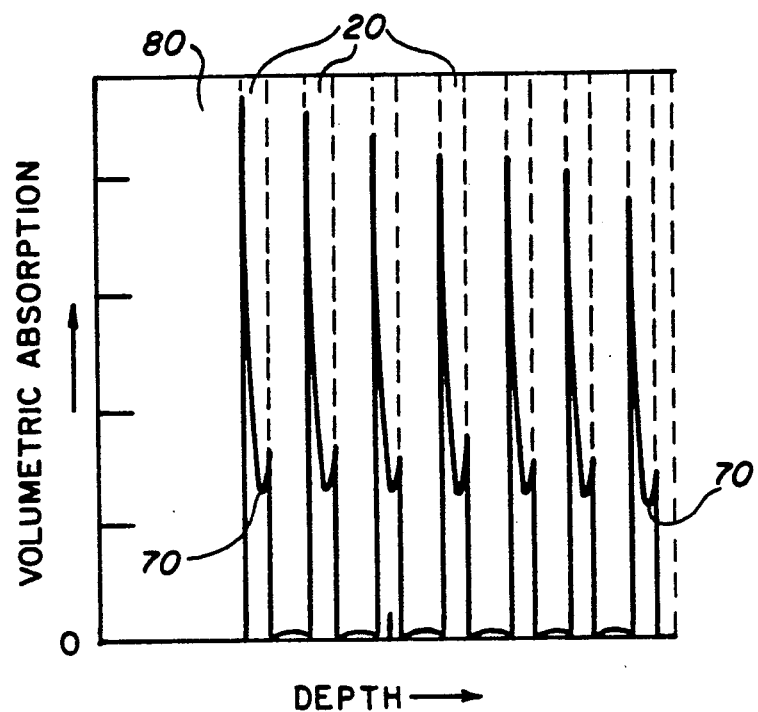
FIG. 3 is a graph of the absorption of radiation within the mirror of FIG. 1.

It is certified that error appears in the above-identified patent and that said Letters Patent is hereby corrected as shown below:

In the drawings:
Sheet 1 of 5, cancel Fig. 2 and substitute Fig. 2 (Amended);
Sheet 3 of 5, cancel Fig. 5 and substitute Fig. 5 (Amended); and
Sheet 5 of 5, cancel Fig. 9 and substitute Fig. 9 (Amended).

Signed and Sealed this

Twenty-fifth Day of October, 1994

Attest:

BRUCE LEHMAN

Attesting Officer     Commissioner of Patents and Trademarks